July 24, 1928.
C. H. THORDARSON
ADJUSTABLE BEARING STRUCTURE
Original Filed Feb. 27, 1925
1,677,937
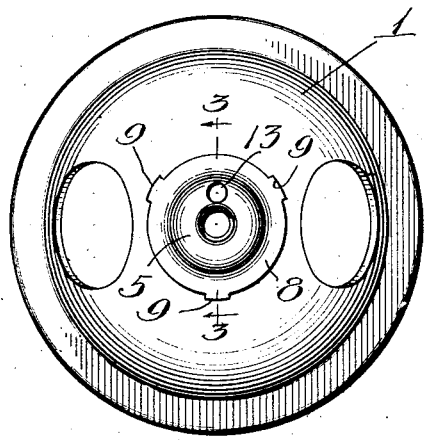
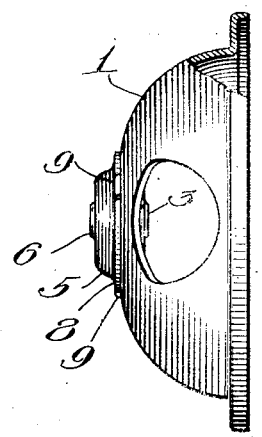
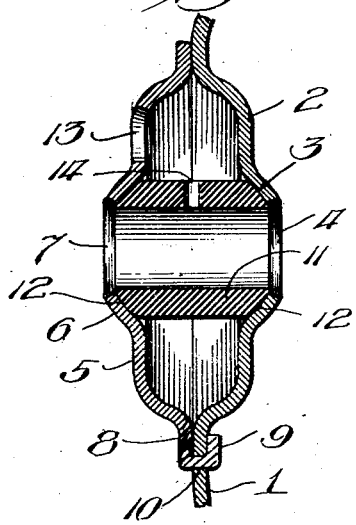
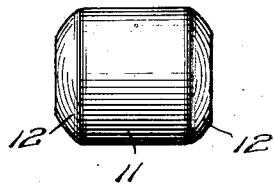
Inventor:
Chester H. Thordarson
by Wm. H. Freudenreich
Atty Patented July 24, 1928.

1,677,937

UNITED STATES PATENT OFFICE.

CHESTER H. THORDARSON, OF CHICAGO, ILLINOIS.

ADJUSTABLE BEARING STRUCTURE.

Original application filed February 27, 1925, Serial No. 12,045. Divided and this application filed March 7, 1927. Serial No. 173,499.

The object of the present invention is to produce a simple and novel self-aligning bearing in a wall of a motor casing, or elsewhere, which shall consist of a few inexpensive parts, easily assembled.

My invention is particularly applicable to the armature bearings of small electric motors, but its usefulness is not limited to this particular field. In carrying out my invention, I provide a chamber formed between two concave elements secured together with their concave sides facing each other; the bottoms of the concavities having registering holes; and there being a tubular element extending across the chamber with the bore thereof registering with said holes; the ends of the tubular member being fragments of a semi-spherical surface, whereby said tubular member, which constitutes the bearing, may rock in any direction and thus prevent binding of the same on a shaft supported thereby. One of the concave elements may be a part of the head of a motor casing, while the other may be a simple sheet metal member fastened in any suitable way to the head.

The various features of novelty whereby my invention is characterized will hereinafter be pointed out with particularity in the claim; but, for for a full understanding of my invention and of its objects and advantages, reference may be had to the following detailed description taken in connection with the accompanying drawing, wherein:

Figure 1 is a front elevation of a sheet metal head for a motor casing, having one of my improved bearings applied thereto; Fig. 2 is an edge view of the head; Fig. 3 is a section on a large scale, on line 3—3 of Fig. 1; and Fig. 4 is an elevation of the tubular bearing member.

Referring to the drawing, 1 represents a wall which in the illustration is a sheet metal head for a motor casing. A portion of the wall is pressed inwardly to form a saucer-like part 2, the center of which is again depressed to form a concave seat 3. The wall is perforated at the center of the seat to provide an opening 4 for the reception of a shaft to be supported. Lying against the outer side or face of the wall 1 is a dish-shaped member having concentric parts 5 and 6 corresponding and similar to the parts 2 and 3, together with a central opening 7. This dish-shaped part has a marginal flange 8 adapted to lie flat against the wall. The flange has a plurality of fingers or prongs 9 projecting radially therefrom; three such prongs being shown. The wall is perforated, as indicated at 10, to receive these fingers or prongs which, when bent over on the inside of the wall, secure the two members together.

The bearing proper consists of a tube 11 having its ends rounded, as indicated at 12, to form parts of the same spherical surface. The length of the tube, and its diameter, are so proportioned that when one end of the tube is placed in the socket 3, before the dish-shaped member or cap is fastened to the wall, the opposite end of the tube will fit into the socket 6 when the cap is applied.

It will be seen that the tube cannot move bodily in a radial direction, but can oscillate in any direction about the center of the sphere of which its rounded ends form parts. Therefore when a shaft is inserted in the tube, if the long axis of the shaft and the corresponding axis of the tube should happen to be at a slight angle to each other, the tube will rock so as to bring these axes together and thus form a common axis for the bearing and the shaft. Thus the bearing becomes self-aligning but, after having aligned itself properly, it supports its end of the shaft in just the same way as though it were a rigidly held bearing. For the purpose of permitting the bearing to be lubricated, I provide the cap with an oil hole 13 at a point above the bearing sleeve or tube, and provide the latter with a port 14 extending through the top thereof.

It will be seen that bearings of any desired length may be made by simply cutting off a piece of tubing and rounding the ends; so that it is possible to secure a long bearing that is capable of rocking, without employing an excess of metal. It will also be seen that since the bearing and its supporting means consist of only two simple parts, aside from the main frame or wall, it is a very inexpensive construction; and, because the fastening of the parts into their final positions is accomplished by the mere bending over of a few prongs, the work of assembling is easy and the cost thereof small. It will be seen, in short, that I have produced an extremely simple and inexpensive bearing which is at the same time self-aligning and efficient and effective in performing the intended functions of a bearing.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

In combination, a wall having a concave recess provided with a central opening, the material of the wall immediately surrounding said opening being shaped to form a second smaller concave recess, a cap lying against said wall over said recesses, that portion of said cap opposite said recesses and the corresponding portion of said wall being symmetrical with respect to the plane separating them, said cap having a central opening registering with the opening in the wall, and a bearing sleeve arranged in the chamber between the cap and the wall and resting at its ends in the central concave recesses, said wall having holes therein in the vicinity of the periphery of said cap, and there being prongs on said cap extending through said holes and bent laterally against said wall.

In testimony whereof, I sign this specification.

CHESTER H. THORDARSON.